US008287815B2

(12) United States Patent
Russell et al.

(10) Patent No.: US 8,287,815 B2
(45) Date of Patent: Oct. 16, 2012

(54) METHODS AND SYSTEMS FOR CONTROLLING TEMPERATURE IN A VESSEL

(75) Inventors: Steven Craig Russell, Houston, TX (US); James Michael Storey, Houston, TX (US); Robert Henri Gauthier, Houston, TX (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 12/114,545

(22) Filed: May 2, 2008

(65) Prior Publication Data
US 2009/0272513 A1 Nov. 5, 2009

(51) Int. Cl.
B01J 19/00 (2006.01)
F28D 7/00 (2006.01)
F28D 21/00 (2006.01)
F25D 17/06 (2006.01)
F02B 43/00 (2006.01)

(52) U.S. Cl. ........... 422/200; 62/89; 60/39.12; 422/198; 422/201; 422/202

(58) Field of Classification Search .............. 62/89, 304; 122/7 R; 60/39.12, 69.464; 48/61, 71–73, 48/76, 127.9, 200–202; 422/148, 198, 200–202; 422/218, 240, 241
See application file for complete search history.

(56) References Cited

U.S. PATENT DOCUMENTS

| 3,653,363 A * | 4/1972 | Romanos ................ 122/32 |
| 3,958,951 A * | 5/1976 | Woebcke et al. ........ 422/201 |
| 4,377,394 A | 3/1983 | Muenger et al. |
| 4,462,339 A * | 7/1984 | Jahnke et al. ............ 122/7 R |
| 4,721,065 A * | 1/1988 | Mohrenstecher et al. .... 122/7 R |
| 4,919,844 A * | 4/1990 | Wang ..................... 252/373 |
| 4,936,376 A * | 6/1990 | Martin et al. ............ 165/71 |
| 5,081,847 A * | 1/1992 | Anderson, Jr. .......... 62/222 |
| 5,167,933 A * | 12/1992 | Norsk ..................... 422/148 |
| 5,188,528 A | 2/1993 | Rast |
| 5,248,316 A * | 9/1993 | Peise et al. ............. 48/76 |
| 5,869,011 A * | 2/1999 | Lee ....................... 422/200 |
| 5,873,329 A | 2/1999 | Heering et al. |
| 6,171,570 B1 * | 1/2001 | Czuppon ................ 423/359 |
| RE37,300 E * | 7/2001 | Nagato et al. .......... 122/4 D |
| 6,553,947 B2 * | 4/2003 | Bradenbaugh ......... 122/14.3 |
| 6,613,127 B1 * | 9/2003 | Galloway et al. ....... 95/149 |

(Continued)

FOREIGN PATENT DOCUMENTS
WO    WO 2007055930 A2 *    5/2007

*Primary Examiner* — Frantz Jules
*Assistant Examiner* — Keith Raymond
(74) *Attorney, Agent, or Firm* — Armstrong Teasdale LLP

(57) ABSTRACT

A method and system for preheating a vessel that includes an area of excess heat and a flow of purge fluid that is channeled to an area to be purged wherein the purge fluid is deficient of heat are provided. The system includes a cooling tube assembly positioned between the area of excess heat and the area to be purged and a first heat exchanger coupled in flow communication to the cooling tube assembly, the first heat exchanger configured to transfer heat between a flow of cooling fluid through the cooling tube assembly and the flow of purge fluid wherein the flow of cooling fluid through the cooling tube assembly is maintained sub-cooled and the flow of purge fluid is heated to facilitate reducing a thermal stress in the area purged.

15 Claims, 8 Drawing Sheets

U.S. PATENT DOCUMENTS

| | | |
|---|---|---|
| 6,827,912 B2 | 12/2004 | Schingnitz et al. |
| 6,837,910 B1 * | 1/2005 | Yoshikawa et al. ...... 48/197 FM |
| 6,840,766 B2 | 1/2005 | Abdullah et al. |
| 6,880,492 B2 | 4/2005 | Gottschalk et al. |
| 2002/0043937 A1 * | 4/2002 | Ogura et al. ............... 315/39.51 |
| 2007/0119577 A1 * | 5/2007 | Kraft et al. .................... 165/157 |

* cited by examiner

METHODS AND SYSTEMS FOR CONTROLLING TEMPERATURE IN A VESSEL

BACKGROUND

This invention relates generally to process systems, and more specifically to methods and systems for improving operation of pressure vessels used in gasification systems.

At least some known vessels include an annular space located near a vertically upper hemispherical head or dome of the vessel. The annular space may be used to consolidate piping ends into headers that channel the flow of fluid in the pipes to and from external to the vessel. Such piping may result in complex pipe routing that reduces a capability to effectively maintain the vessel. Specifically, a refractory lined throat that carries hot fluid into the vessel from, for example, a gasifier may be difficult to maintain because of the piping located in the head. The hot fluid may leak into the annular space from inside the throat. The leaking fluid may include corrosive gases that over time may shorten the life of components in the upper hemispherical head. Moreover, the refractory lined throat that carries hot fluid from the gasifier into the vessel tends to overheat.

Furthermore, various materials and various thicknesses of the materials may be used in the fabrication of the vessel, head, and/or components within the vessel and head. Because such materials and various thicknesses of materials may expand and contract at different rates when exposed to changing temperatures within the vessel. Thermal stresses may be generated that exceed the strength and/or the cycle fatigue rating of the vessel, head, and/or components.

SUMMARY

In one embodiment, a system for preheating a vessel that includes an area of excess heat and a flow of purge fluid that is channeled to an area to be purged wherein the purge fluid is deficient of heat are provided. The system includes a cooling tube assembly positioned between the area of excess heat and the area to be purged and a first heat exchanger coupled in flow communication to the cooling tube assembly, the first heat exchanger configured to transfer heat between a flow of cooling fluid through the cooling tube assembly and the flow of purge fluid wherein the flow of cooling fluid through the cooling tube assembly is maintained sub-cooled and the flow of purge fluid is heated to facilitate reducing a thermal stress in the area purged.

In another embodiment, a method of controlling temperature in a vessel including a throat configured to channel a relatively high temperature fluid into the vessel and wherein the throat includes a conduit extending from a vessel opening to a vessel interior is provided. The method includes channeling a flow of sub-cooled cooling fluid proximate the throat such that heat from the throat is transferred to the flow of cooling fluid and the cooling fluid remains sub-cooled. The method also includes raising a temperature of a flow of purge gas using the flow of cooling fluid, and releasing the purge gas into a volume of the vessel that is relatively heat deficient such that the volume is purged and heated by the released purge gas.

In yet another embodiment, a syngas cooler system includes a pressure vessel having an outer shell with a penetration therethrough. The pressure vessel includes a first compartment and a second compartment. The cooler system also includes a throat substantially axially aligned with the penetration and that extends from the penetration through the first compartment to the second compartment. The throat is also lined with a refractory material. The system also includes a cooling tube assembly circumscribing the refractory material and a first heat exchanger. The first heat exchanger includes a first flow path and a second flow path. The first flow path is coupled in flow communication with the cooling tube assembly and the second flow path is in thermal communication with the first flow path. The system further includes a purge supply system coupled in flow communication with the second flow path. The purge supply system is further coupled in flow communication with the first compartment and wherein during operation, heat absorbed by the cooling tube assembly is transferred through the heat exchanger to the purge supply system. The cooling tube assembly, the first heat exchanger, and the purge supply system are sized to maintain a flow of cooling fluid through the cooling tube assembly in a sub-cooled state.

BRIEF DESCRIPTION OF THE DRAWINGS

FIG. 1 is a schematic diagram of an exemplary integrated gasification combined-cycle (IGCC) power generation system in accordance with an embodiment of the present invention;

FIG. 2 shows a schematic cross-sectional view of the syngas cooler shown in FIG. 1; and FIG. 3 is a schematic diagram of a vessel cooling system in accordance with an exemplary embodiment of the present invention;

FIG. 4 is a schematic diagram of a vessel cooling system in accordance with another embodiment of the present invention;

FIG. 5 is a schematic diagram of a vessel cooling system in accordance with another embodiment of the present invention;

FIG. 6 is a schematic diagram of a vessel cooling system in accordance with another embodiment of the present invention;

FIG. 7 is a schematic diagram of a vessel cooling system in accordance with another embodiment of the present invention; and FIG. 8 is a schematic diagram of a vessel cooling system in accordance with another embodiment of the present invention.

DETAILED DESCRIPTION OF THE INVENTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, systems and methods for preheating and purging a pressure vessel space. However, it is contemplated that this disclosure has general application to controlling temperature in commercial and industrial spaces.

Figure 1:
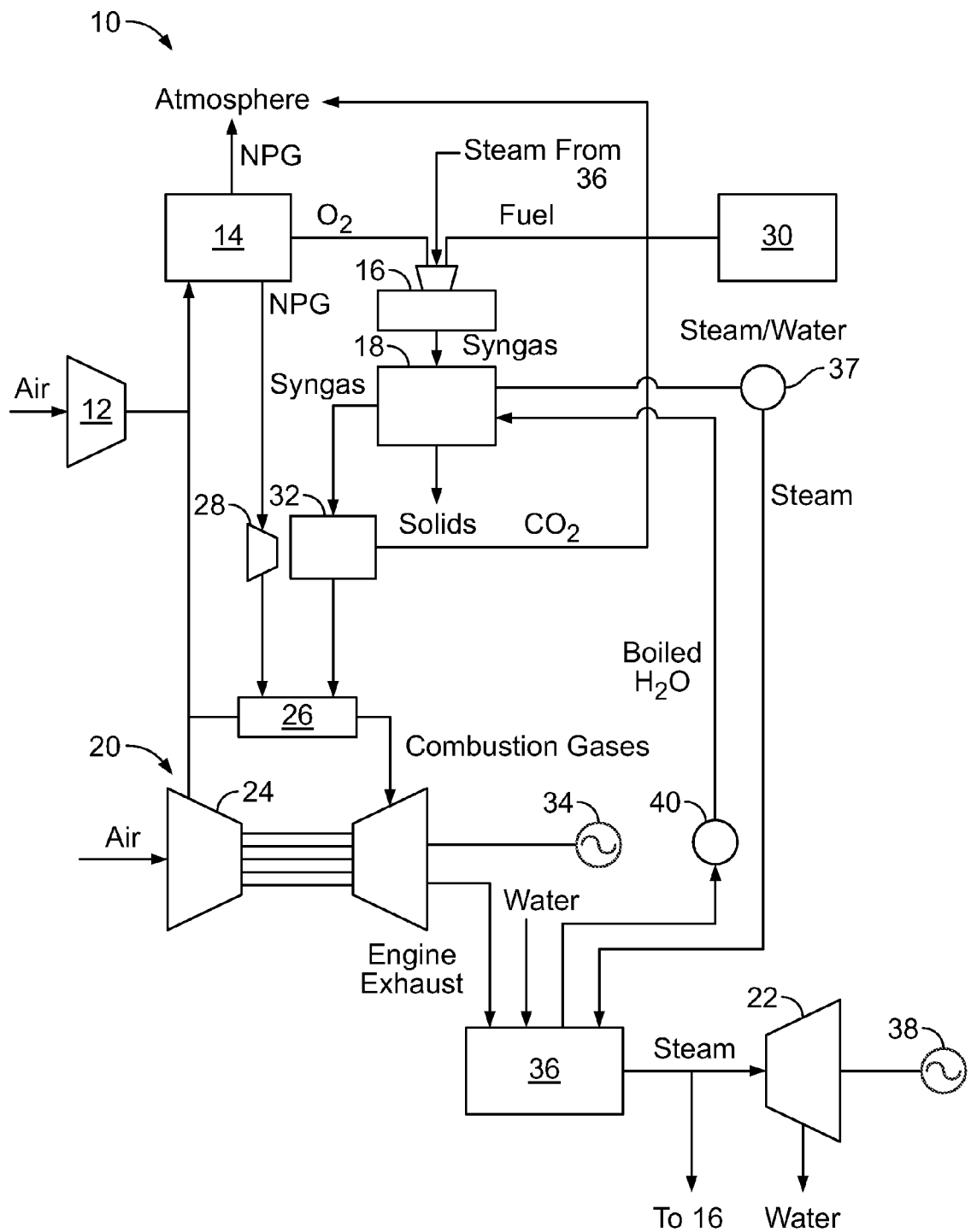
FIGS. 1-8 show exemplary embodiments of the methods and systems described herein.

FIG. 1 is a schematic diagram of an exemplary integrated gasification combined-cycle (IGCC) power generation system 10 in accordance with an embodiment of the present invention. In the exemplary embodiment, IGCC system 10 includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen (O2) and a gas by-product, sometimes referred to as a "process gas." The $O_2$ flow is channeled to gasifier 16 for use in generating partially oxidized gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for cleaning the syngas before it is channeled to gas turbine engine combustor 26 for combustion thereof. Carbon dioxide (CO2) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that supplies boiled water from steam generator 36 to syngas cooler 18 to facilitate cooling the syngas channeled from gasifier 16. The boiled water is channeled through syngas cooler 18 where the water is converted to steam. The boiled water generally comprises a steam/water mixture that is separated into a flow of high-pressure steam and water in a steam drum 37. The steam from cooler 18 is then returned to steam generator 36 for use within gasifier 16, syngas cooler 18, and/or steam turbine 22. The water is returned to syngas cooler 18.

Figure 2:
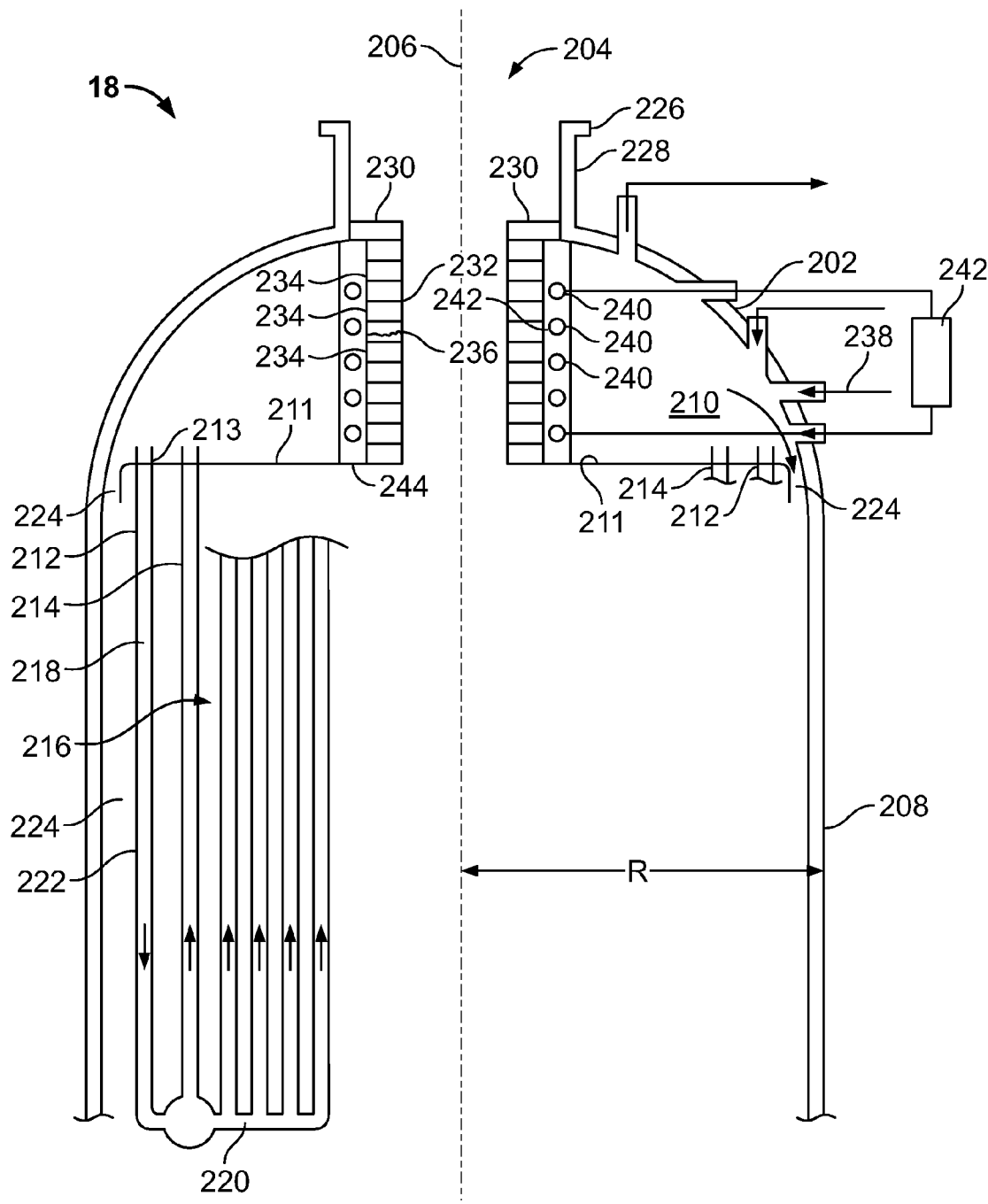

FIG. 2 is a schematic cross-sectional view of syngas cooler 18 (shown in FIG. 1). In the exemplary embodiment, syngas cooler 18 is a radiant syngas cooler. Syngas cooler 18 includes a pressure vessel shell 202 having a top opening 204 and a bottom opening (not shown) that are generally concentrically aligned with each other along a centerline 206 of syngas cooler 18. As referred to herein, an "axial" direction is a direction that is substantially parallel to centerline 206, an "upward" direction is a direction that is generally towards top opening 204, and a "downward" direction is a direction that is generally towards the bottom opening. Syngas cooler 18 includes a radius R measured from centerline 206 to an outer surface 208 of shell 202. Furthermore, in the exemplary embodiment, a dome 210 of cooler 18 includes dome floor 211 that includes a plurality of downcomer openings 213 and a plurality of riser openings (not shown) that circumscribe the top opening. In the exemplary embodiment, shell 202 is fabricated from a pressure vessel quality steel, such as, but not limited to, a chromium molybdenum steel. As such, shell 202 is facilitated to withstand the operating pressures of syngas flowing through syngas cooler 18. Moreover, in the exemplary embodiment, the shell top opening is coupled in flow communication with gasifier 16 for receiving syngas discharged from gasifier 16. The bottom opening of shell 202, in the exemplary embodiment, is coupled in flow communication with a slag collection unit (not shown) to enable the collection of solid particles formed during gasification and/or cooling.

Within shell 202, in the exemplary embodiment, are a plurality of heat transfer medium supply lines (also referred to herein as "downcomers") 212, a heat transfer wall (also referred to herein as a "tube wall") 214, and a plurality of heat transfer panels (also referred to herein as "platens") 216. More specifically, in the exemplary embodiment, downcomers 212 are positioned radially inward of shell 202, tube wall 214 is radially inward of downcomers 212, and platens 216 are arranged within tube wall 214 such that tube wall 214 substantially circumscribes platens 216.

In the exemplary embodiment, downcomers 212 supply a heat transfer medium 218, such as, for example, water from steam generator 36, to syngas cooler 18, as described herein. Downcomers 212 supply heat transfer medium 218 to tube wall 214 and platens 216 via a lower manifold 220. Lower manifold 220, in the exemplary embodiment, is coupled proximate to the cooler bottom opening, and, as such, is downstream from cooler top opening 204 through which syngas enters cooler 18. In the exemplary embodiment, downcomers 212 include tubes 222 fabricated from a material that enables cooler 18 and/or system 10 to function as described herein. Furthermore, in the exemplary embodiment, a gap 224 defined between shell 202 and tube wall 214 may be pressurized to facilitate decreasing stresses induced to tube wall 214.

Shell 202 includes a flange 226 that may be used to couple cooler 18 to gasifier 16 (shown in FIG. 1) a throat 228 extends vertically upward from shell 202 to flange 226. A refractory lining 230 extends along throat 228 from shell 202 to dome floor 211. Syngas received from gasifier 16 passes through throat 228 and refractory lining 230. Accordingly, throat 228 and refractory lining 230 are subject to the high temperature of the syngas flow. In an alternative embodiment, refractory lining 230 extends vertically upward and radially inwardly from throat 228. In the exemplary embodiment, refractory lining 230 comprises a plurality of stackable bricks of refractory material. In an alternative embodiment, refractory lining comprises a castable refractory material formed to fit through opening 204.

During operation, a portion of the syngas flowing through throat 228 may pass through a gap 232 between individual bricks 234 of refractory lining 230 or may pass through a crack 236 that may develop in a brick 234 or in the castable refractory 230. The syngas leaking from throat 228 into dome 210 may cause corrosion or high temperature degradation of shell 202 or components (not shown for clarity) located within dome 210. In the exemplary embodiment, dome 210 may be purged and/or pressurized by a flow of gas 238, such as nitrogen. Gas flow 238 is pre-heated prior to be introduced into dome 210 to avoid a temperature differential that may cause temperature stress on components or shell 202 that are exposed to flow 238 and/or thermal stress at the interface between the purge fluid piping and vessel nozzle. Gap 224 permits flow 238 to escape dome 210 into the area between shell 202 and downcomers 212. A cooled tube bundle 240 circumscribes throat 228 to facilitate removing heat transmitted through refractory lining 230 from the high temperature syngas flowing through throat 228. Cooled tube bundle 240 receives a flow of sub-cooled water from a cooling circuit 242. As used herein, sub-cooled refers to a state at a temperature below the boiling temperature of the cooling fluid.

Figure 3:
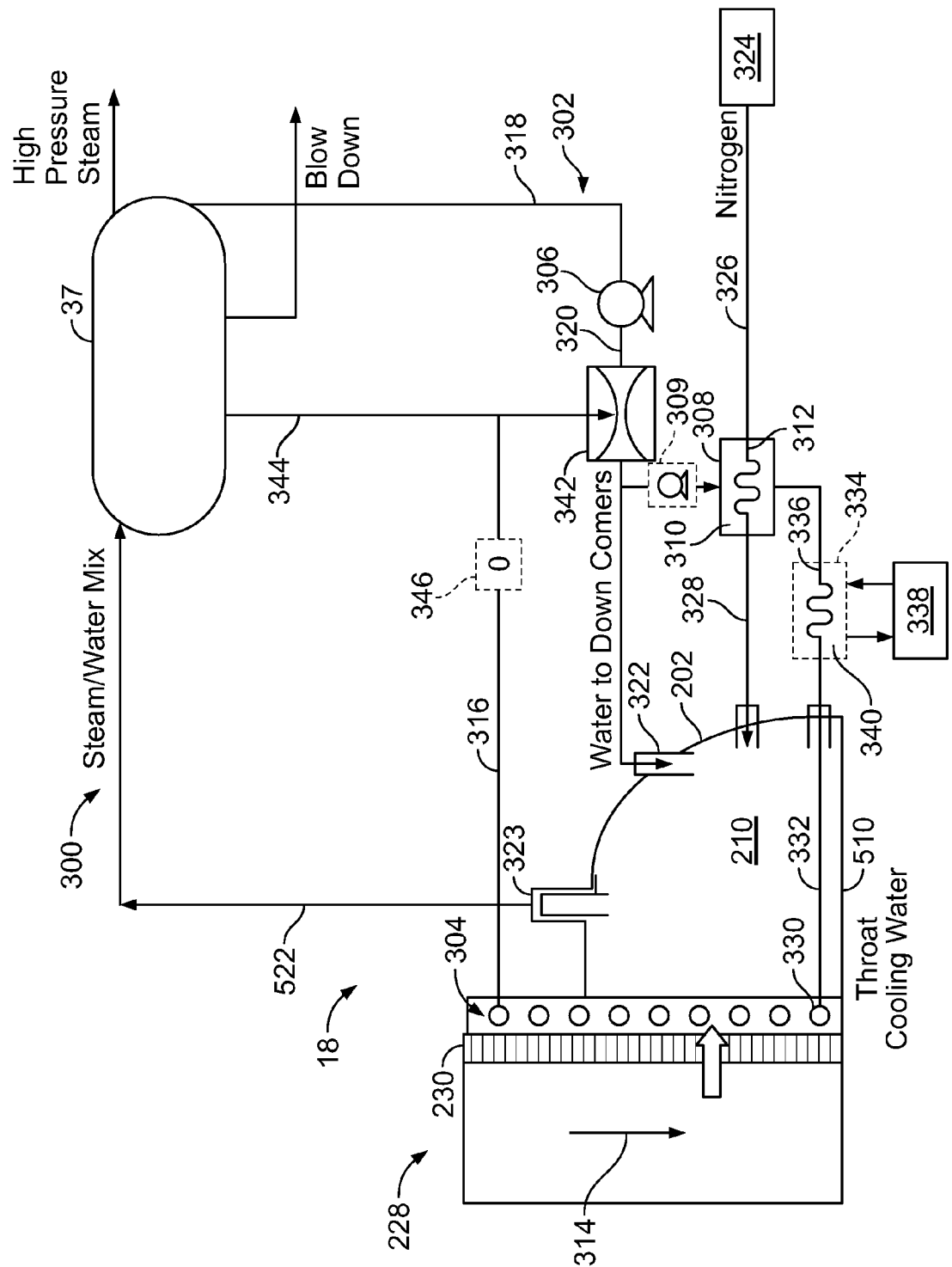

FIG. 3 is a schematic diagram of a vessel cooling system 300 in accordance with an exemplary embodiment of the present invention that may be used with syngas cooler 18. In the exemplary embodiment, system 300 includes a throat cooling circuit 302 comprising a cooling tube assembly 304, a pump 306, and a first heat exchanger 308 all in serial flow communication. Pump 306 is sized to circulate water from the steam drum 37 to the syngas cooler downcomers 322 and to cooling tube assembly 304 through a first heat exchanger 308 sized to maintain a flow of throat cooling fluid circulating through cooling tube assembly 304 in a sub-cooled state. If adequate sub-cooling is not provided prior to entering cooling tube assembly 304, then boiling of the flow of throat cooling fluid is likely to occur. Boiling may tend to damage to components and/or seals (not shown) in an area of throat 228. An auxiliary circulating pump 309 may be used to facilitate moving water through throat cooling circuit 302.

Cooling tube assembly 304 comprises a horizontally coiled tubing configured to transfer heat from throat 228 and refractory 230 to the flow of throat cooling fluid circulating through system 302. In an alternative embodiment, cooling tube assembly 304 includes a plurality of vertically oriented tubes joined at top and bottom ends at substantially circular headers that circumscribe throat 228. First heat exchanger 308 includes a first flow path 310 in thermal communication with a second flow path 312. In the exemplary embodiment, first flow path 310 is configured to channel a throat cooling fluid such as but not limited to water and second flow path 312 is configured to channel a purge fluid such as but not limited to nitrogen. Additionally, nitrogen injection at elevated pressure of approximately 655 psig is used for syngas cooler 18 during operation. High pressure nitrogen is supplied by liquid nitrogen that is pumped to the elevated pressure and a relatively low temperature of approximately 100° F. However, the metal surfaces inside syngas cooler 18 and the vessel walls including nozzles of the syngas cooler are at a relatively higher temperature for example, approximately 700-1200° F. during operation. If relatively cold nitrogen is injected into syngas cooler 18 at a temperature much lower than the metal surfaces on the interior of vessel shell 202 or than the metal surfaces of the vessel shell including nozzles, life-limiting thermal stress may occur. Pump 306 provides a fluid driving force to circulate the throat cooling fluid through system 302.

During operation, a flow of syngas 314 from gasifier 16 (shown in FIG. 1) passes refractory lining 230 giving up some of its heat, which is then conducted to cooling tube assembly 304 and some of the heat is transferred to the flow of throat cooling fluid. The still sub-cooled throat cooling fluid exits cooling tube assembly 304 through an outlet conduit 316. Outlet conduit 316 couples to a suction header 318 of an eductor 342. Suction header 318 also couples to drum 37 providing a source of makeup water and net positive suction head (NPSH) for pump 306. Pump 306 discharges to a discharge header 320 coupled to a downcomer 322 that penetrates shell 202 and to first flow path 310. The flow into downcomer 322 circulates through platens 216 and exits cooler 18 through a riser 323 and is returned to drum 37 as a high pressure steam/water mixture. Relatively hot throat cooling fluid passes through first flow path 310 giving up a portion of its heat to a purge fluid flowing through second flow path 312. The purge fluid flows from a source 324 through a purge supply conduit 326 that is coupled in flow communication with second flow path 312. From second flow path 312, the purge fluid flows through a conduit 328 into a first compartment of cooler 18 such as dome 210. In the exemplary embodiment, the temperature of the purge fluid increase from approximately 100° F. to approximately 700° F. through first heat exchanger 308. The cooled throat cooling fluid exits first flow path 310 and is channeled to an inlet 330 of cooling tube assembly 304 through a conduit 332.

In an alternative embodiment, a second heat exchanger 334 is coupled in series flow communication with cooling tube assembly 304. The cooled throat cooling fluid from first flow path 310 is channeled through a first flow path 336 of second heat exchanger 334. An auxiliary cooling fluid 338 is circulated through a second flow path 340 of second heat exchanger 334 to further sub-cool the throat cooling fluid. In another alternative embodiment, an eductor 342 is coupled in flow communication to pump 306 through discharge header 320. A suction of eductor 342 is coupled to drum 37 through a conduit 344. Eductor 342 is configured to facilitate moving a larger flow of downcomer water through system 302. In still another alternative embodiment, an orifice 346 is positioned in outlet conduit 316. Orifice 346 is sized to increase a back pressure in cooling tube assembly 304 to facilitate providing an increased sub-cooling margin for the flow of throat cooling fluid in cooling tube assembly 304.

In the exemplary embodiment, system 300 is configured to transfer heat from high-pressure saturated water in syngas cooler 18 to a nitrogen source 324 external to vessel shell 202. The heat leaving the high-pressure water provides sub-cooling of the water before entering cooling tube assembly 304. Sub-cooling is used to prevent boiling in the susceptible throat seal region. Preheating purge fluid facilitates avoiding excessive thermal stresses at the vessel nozzle penetrations.

Figure 4:
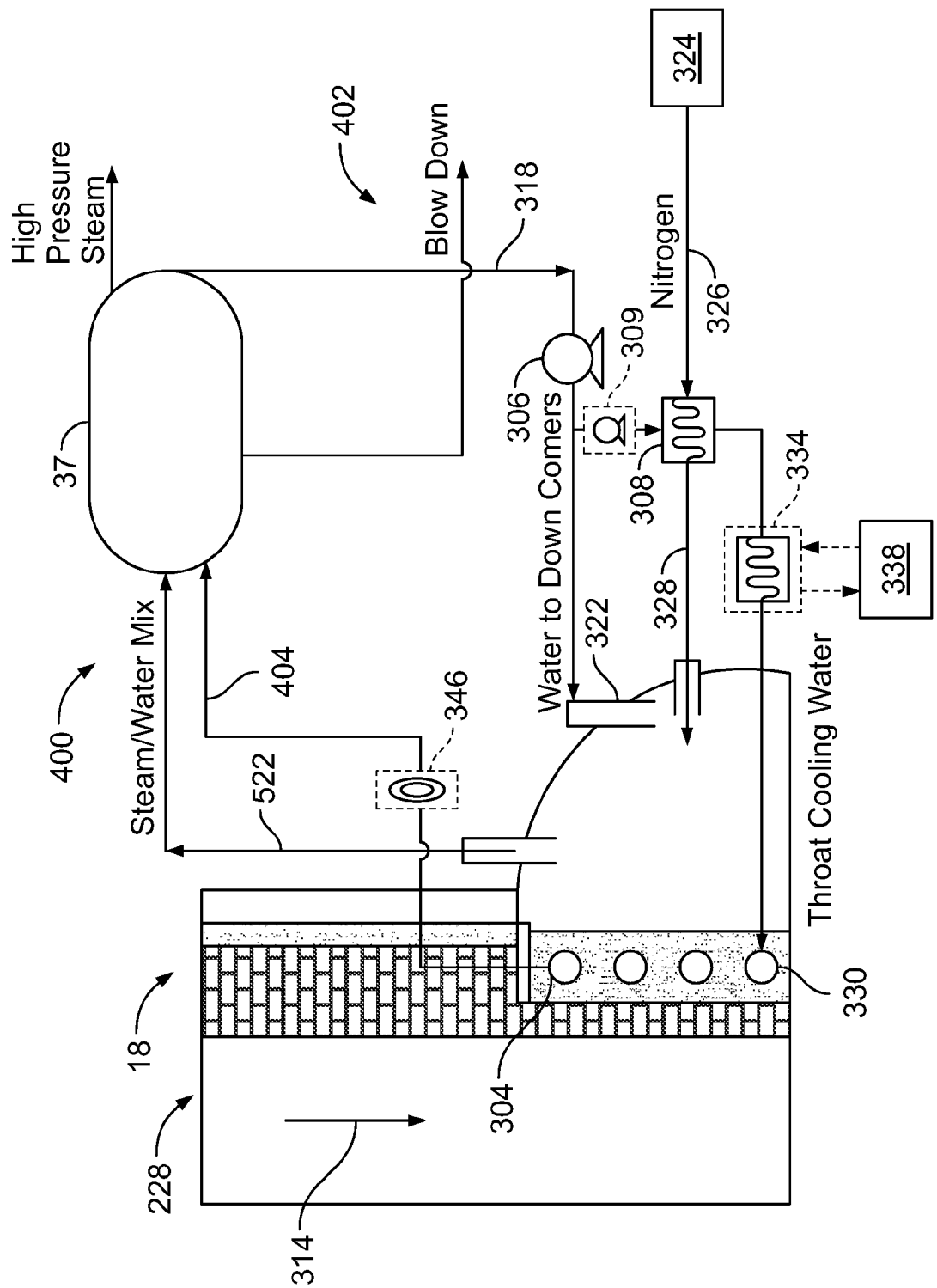

FIG. 4 is a schematic diagram of a vessel cooling system 400 in accordance with another embodiment of the present invention. Vessel cooling system 400 is substantially similar to vessel cooling system 300 (shown in FIG. 3) and components of vessel cooling system 400 that are identical to components of vessel cooling system 300 are identified in FIG. 4 using the same reference numerals used in FIG. 3.

In the exemplary embodiment, vessel cooling system 400 includes a throat cooling circuit 402 comprising a cooling tube assembly 304, a pump 306, and a first heat exchanger 308 all in serial flow communication. Pump 306 is sized to circulate water from steam drum 37 to syngas cooler downcomers 322, and a first heat exchanger 308 sized to maintain a flow of throat cooling fluid circulating through cooling tube assembly 304 in a sub-cooled state. An auxiliary circulating pump 309 may be used to facilitate moving water through throat cooling circuit 402. Boiling may tend to damage to components and/or seals (not shown) in an area of throat 228. In this embodiment, cooling tube assembly 304 is coupled in flow communication to drum 37 directly through an outlet conduit 404 or alternatively to drum 37 through orifice 346 positioned in outlet conduit 404.

Figure 5:
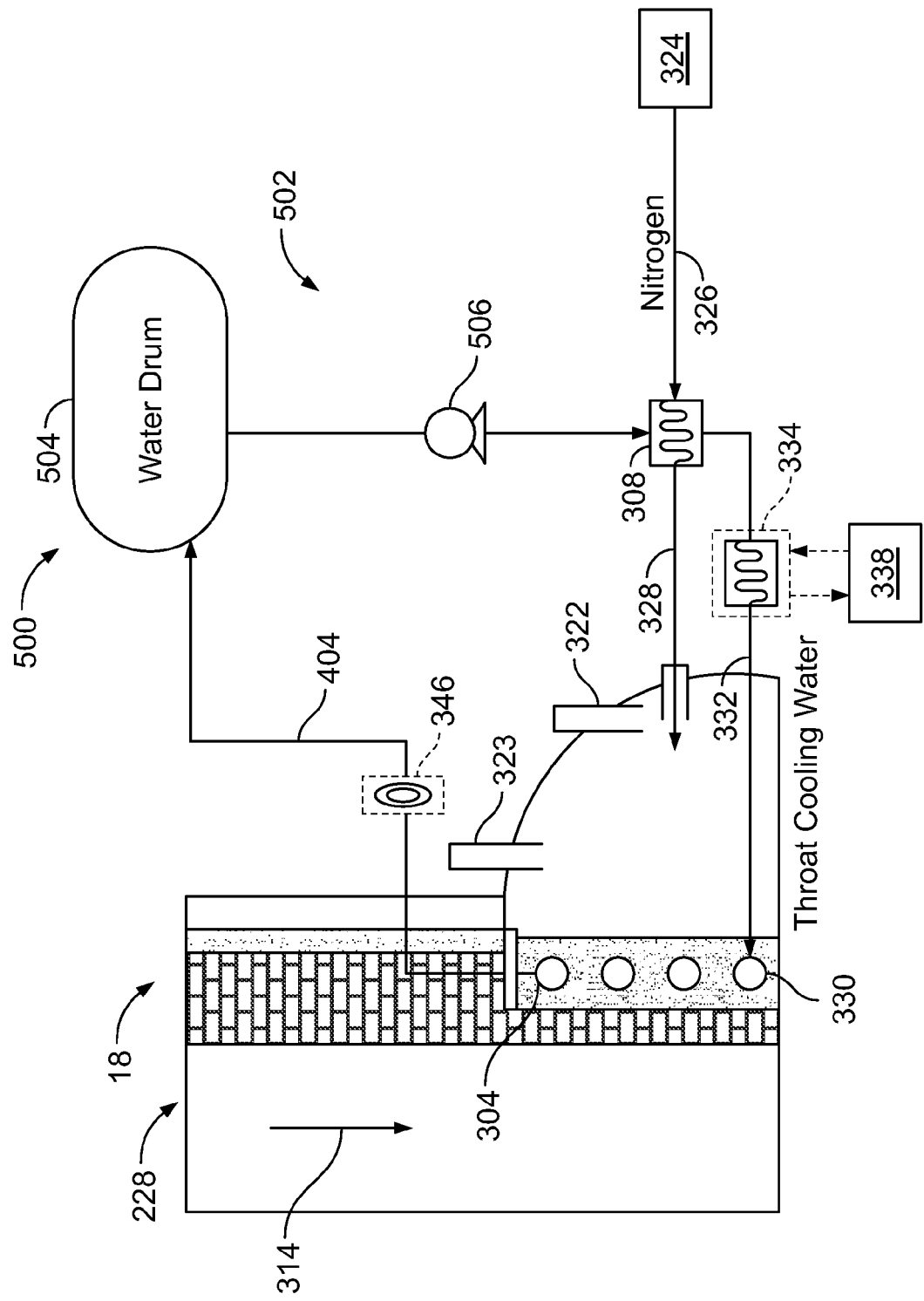

FIG. 5 is a schematic diagram of a vessel cooling system 500 in accordance with another embodiment of the present invention. Vessel cooling system 500 is substantially similar to vessel cooling system 300 (shown in FIG. 3) and components of vessel cooling system 500 that are identical to components of vessel cooling system 300 are identified in FIG. 5 using the same reference numerals used in FIG. 3.

In the exemplary embodiment, vessel cooling system 500 includes a throat cooling circuit 502 comprising a cooling tube assembly 304, a pump 506, and a first heat exchanger 308 all in serial flow communication. Pump 506 is sized to circulate water from a steam drum 504 to cooling tube assembly 304 through first heat exchanger 308 and/or second heat exchanger 334. First heat exchanger 308 and/or second heat exchanger 334 are sized to maintain a flow of throat cooling fluid circulating through cooling tube assembly 304 in a sub-cooled state. Boiling may tend to damage to components and/or seals (not shown) in an area of throat 228. In this embodiment, cooling tube assembly 304 is coupled in flow communication to drum 37 directly through an outlet conduit 404 or alternatively to drum 37 through orifice 346 positioned in outlet conduit 404. Steam drum 504 may be the same steam drum as steam drum 37 or may be a separate water drum.

Figure 6:
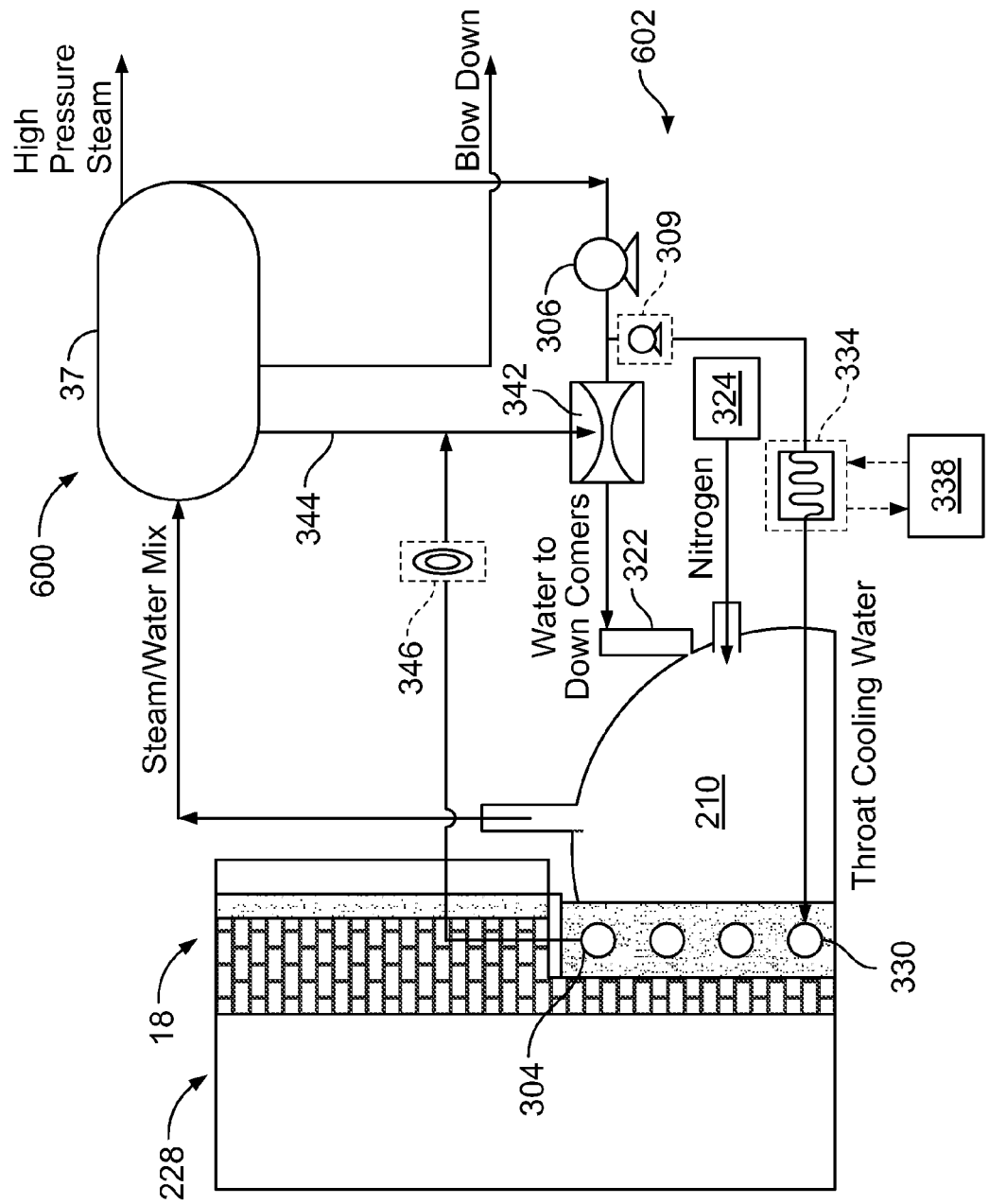

FIG. 6 is a schematic diagram of a vessel cooling system 600 in accordance with another embodiment of the present invention. Vessel cooling system 600 is substantially similar to vessel cooling system 300 (shown in FIG. 3) and components of vessel cooling system 600 that are identical to components of vessel cooling system 300 are identified in FIG. 6 using the same reference numerals used in FIG. 3.

In the exemplary embodiment, vessel cooling system 600 includes a throat cooling circuit 602 comprising a cooling tube assembly 304, a pump 306, and a heat exchanger 334 all in serial flow communication. Pump 306 is sized to circulate water from a steam drum 37 to cooling tube assembly 304 through heat exchanger 334. Heat exchanger 334 is sized to maintain a flow of throat cooling fluid circulating through cooling tube assembly 304 in a sub-cooled state. Boiling may tend to damage to components and/or seals (not shown) in an area of throat 228. In this embodiment, cooling tube assembly 304 is coupled in flow communication to drum 37 directly through an outlet conduit 404 or alternatively to drum 37 through orifice 346 positioned in outlet conduit 404. Steam drum 504 may be the same steam drum as steam drum 37 or may be a separate steam drum. In the exemplary embodiment, the flow of nitrogen from nitrogen source 324 to dome 210 is not used for cooling throat cooling water, but rather auxiliary cooling fluid 338 is used. Additionally, nitrogen source 324 is provided with heat separate from throat cooling water.

Figure 7:
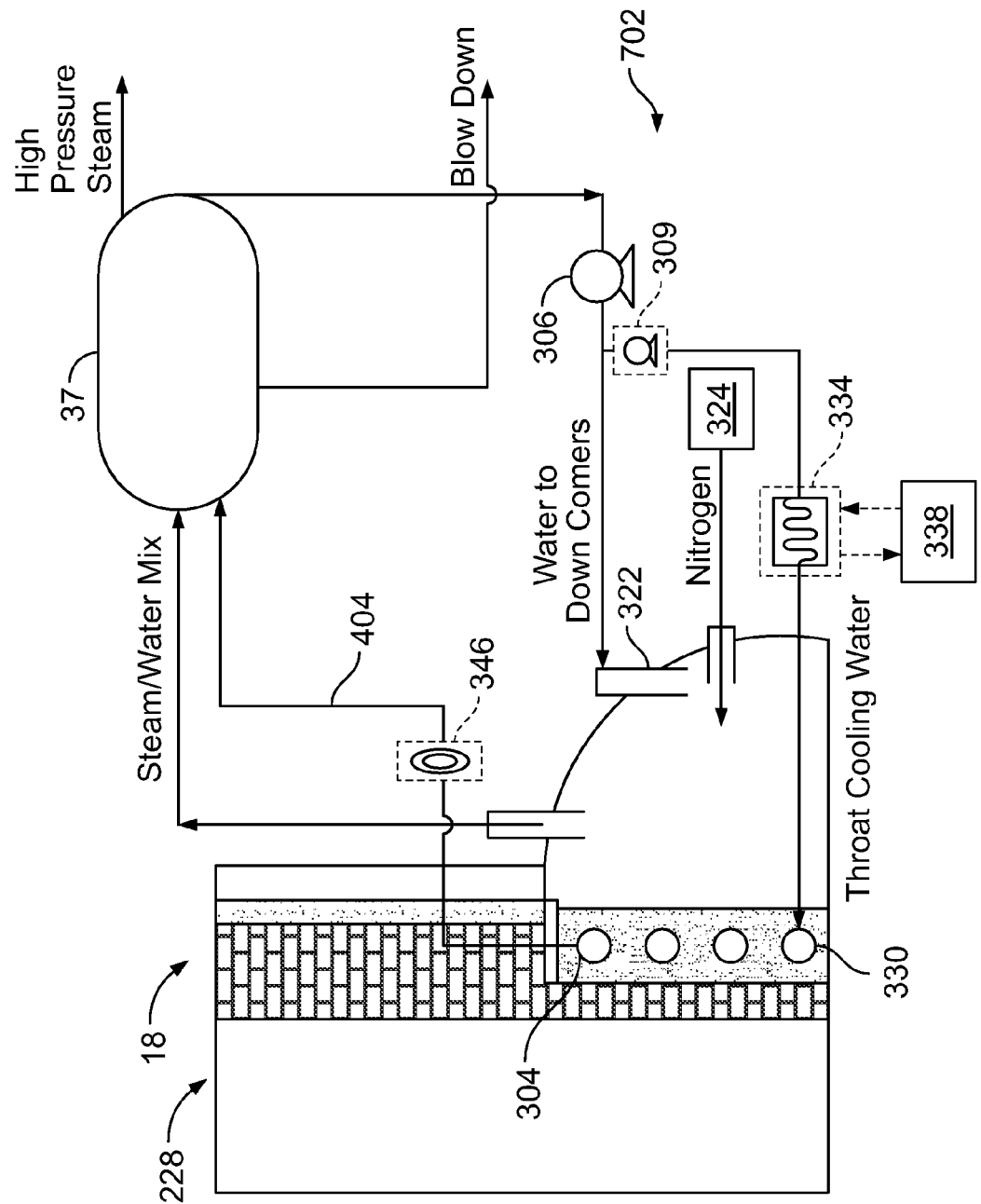

FIG. 7 is a schematic diagram of a vessel cooling system 700 in accordance with another embodiment of the present invention. Vessel cooling system 700 is substantially similar to vessel cooling system 300 (shown in FIG. 3) and components of vessel cooling system 700 that are identical to components of vessel cooling system 300 are identified in FIG. 7 using the same reference numerals used in FIG. 3.

In the exemplary embodiment, vessel cooling system 700 includes a throat cooling circuit 702 comprising a cooling tube assembly 304, a pump 306, and a heat exchanger 334 all in serial flow communication. Pump 306 is sized to circulate water from steam drum 37 to syngas cooler downcomers 322. An auxiliary circulating pump 309 may be used to facilitate moving water through throat cooling circuit 702. Heat exchanger 334 is sized to maintain a flow of throat cooling fluid circulating through cooling tube assembly 304 in a sub-cooled state. Boiling may tend to damage to components and/or seals (not shown) in an area of throat 228. In this embodiment, cooling tube assembly 304 is coupled in flow communication to drum 37 directly through an outlet conduit 404 or alternatively to drum 37 through orifice 346 positioned in outlet conduit 404. In the exemplary embodiment, the flow of nitrogen from nitrogen source 324 to dome 210 is not used for cooling throat cooling water, but rather auxiliary cooling fluid 338 is used. Additionally, nitrogen source 324 is provided with heat separate from throat cooling water.

Figure 8:
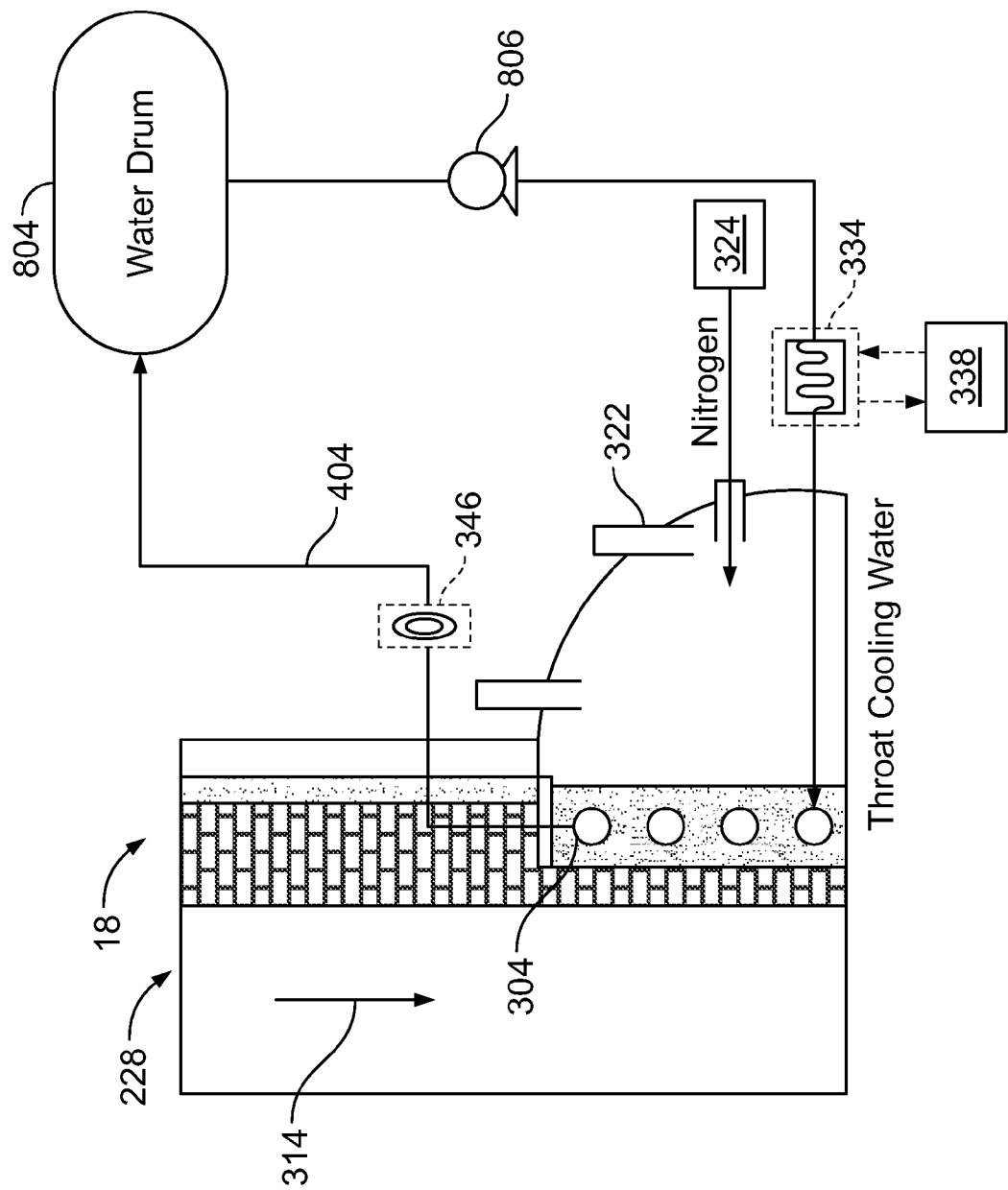

FIG. 8 is a schematic diagram of a vessel cooling system 800 in accordance with another embodiment of the present invention. Vessel cooling system 800 is substantially similar to vessel cooling system 300 (shown in FIG. 3) and components of vessel cooling system 800 that are identical to components of vessel cooling system 300 are identified in FIG. 8 using the same reference numerals used in FIG. 3.

In the exemplary embodiment, vessel cooling system 800 includes a throat cooling circuit 802 comprising a cooling tube assembly 304, a pump 806, and a heat exchanger 334 all in serial flow communication. Pump 806 is sized to circulate water from a steam drum 804 to cooling tube assembly 304 through heat exchanger 334. Heat exchanger 334 is sized to maintain a flow of throat cooling fluid circulating through cooling tube assembly 304 in a sub-cooled state. Boiling may tend to damage to components and/or seals (not shown) in an area of throat 228. In this embodiment, cooling tube assembly 304 is coupled in flow communication to drum 804 directly through an outlet conduit 404 or alternatively to drum 804 through orifice 346 positioned in outlet conduit 404. Steam drum 804 may be the same steam drum as steam drum 37 or may be a separate water drum.

Exemplary embodiments of systems and methods for preheating and purging a pressure vessel space are described above in detail. The systems and methods illustrated are not limited to the specific embodiments described herein, but rather, components of the system may be utilized independently and separately from other components described herein. Further, steps described in the method may be utilized independently and separately from other steps described herein.

While embodiments of the disclosure have been described in terms of various specific embodiments, it will be recognized that the embodiments of the disclosure can be practiced with modification within the spirit and scope of the claims.

What is claimed is:
1. A system for preheating a vessel including a high-temperature fluid inlet throat, an outer shell, and a purge volume defined therebetween, said system comprising:
   a throat cooling tube assembly positioned between the vessel inlet throat and the purge volume, said throat cooling tube assembly comprises horizontally coiled tubing circumscribing the inlet throat;
   a first heat exchanger coupled in flow communication to said throat cooling tube assembly, said first heat exchanger configured to transfer heat between a flow of sub-cooled cooling fluid channeled from said throat cooling tube assembly and a flow of purge fluid into the purge volume;
a second heat exchanger coupled downstream of said first heat exchanger and upstream of said throat cooling tube assembly; and
a steam drum coupled in flow communication with said first heat exchanger via a conduit, said throat cooling tube assembly is coupled in flow communication with at least one of said steam drum and said conduit,
wherein said flow of cooling fluid channeled into and out of said cooling tube assembly and into at least one of said steam drum, said first heat exchanger, and said second heat exchanger is maintained sub-cooled and said flow of purge fluid into the purge volume is heated to facilitate reducing a thermal stress in the inlet throat and the outer shell.

2. A system in accordance with claim 1, wherein the inlet throat is configured to channel products of partial oxidation into the vessel and said throat cooling tube assembly is configured to remove heat therefrom.

3. A system in accordance with claim 2, wherein the inlet throat comprises a refractory based lining positioned between the products of partial oxidation and said throat cooling tube assembly.

4. A system in accordance with claim 1, wherein said first heat exchanger includes a first flow path coupled in flow communication with said throat cooling tube assembly.

5. A system in accordance with claim 4, wherein said first heat exchanger includes a second flow path in thermal communication with said first flow path, said second flow path coupled in flow communication with said flow of purge fluid, said first heat exchanger is configured to sub-cool said flow of cooling fluid.

6. A system in accordance with claim 1 further comprising an orifice element in an outlet of said throat cooling tube assembly, said orifice element sized to maintain a pressure in said throat cooling tube assembly sufficient to maintain said flow of cooling fluid sub-cooled.

7. A system in accordance with claim 1 further comprising a pump coupled in flow communication between said throat cooling tube assembly and said heat exchanger, said pump configured to provide a driving head to circulate said cooling fluid.

8. A system in accordance with claim 7 further comprising an eductor, said eductor driven by said pump, a suction of said eductor coupled in flow communication with said throat cooling tube assembly.

9. A method of controlling temperature in a vessel including a high-temperature fluid inlet throat, an outer shell, and a purge volume defined therebetween, the inlet throat including a conduit extending from a vessel opening to a vessel interior, said method comprising:
channeling a flow of sub-cooled cooling fluid into horizontally coiled tubing that circumscribes the inlet throat such that heat from the inlet throat is transferred to the flow of sub-cooled cooling fluid and the cooling fluid remains sub-cooled upon exiting from the horizontally coiled tubing;
channeling at least a portion of the sub-cooled cooling fluid exiting from the horizontally coiled tubing into at least one of a steam drum and a first heat exchanger;
raising a temperature of a flow of purge gas using the flow of sub-cooled cooling fluid;
channeling the sub-cooled fluid from the first heat exchanger into a second heat exchanger coupled downstream of the first heat exchanger; and
releasing the purge gas into the purge volume of the vessel that is relatively heat deficient such that the purge volume is purged and heated by the released purge gas.

10. A method in accordance with claim 9, wherein channeling at least a portion of the sub-cooled cooling fluid comprises channeling a flow of sub-cooled cooling fluid through a first flow path of the heat exchanger.

11. A method in accordance with claim 9, wherein raising a temperature of a purge gas using the flow of cooling fluid comprises channeling a flow of purge gas through a second flow path of the heat exchanger.

12. A syngas cooler system, comprising:
a pressure vessel comprising an outer shell having a penetration therethrough, said pressure vessel comprising a first compartment and a second compartment;
a throat substantially axially aligned with said penetration, said throat extending from said penetration through said first compartment to said second compartment, said throat lined with a refractory material;
a cooling tube assembly circumscribing said refractory material, said cooling tube assembly comprises horizontally coiled tubing that circumscribes said throat;
a first heat exchanger comprising a first flow path and a second flow path;
a steam drum, said first heat exchanger is coupled in flow communication with at least one of said steam drum and said cooling tube assembly, thereby defining at least a portion of said first flow path, said second flow path in thermal communication with said first flow path;
a second heat exchanger comprising a third flow path and a fourth flow path, said fourth flow path in thermal communication with said third flow path, said third flow path coupled in flow communication with said first flow path of said first heat exchanger, said fourth flow path coupled in flow communication with a heat sink external to said vessel; and
a purge supply system coupled in flow communication with said second flow path, said purge supply system further coupled in flow communication with said first compartment, wherein during operation heat absorbed by said cooling tube assembly is transferred through said heat exchanger to said purge supply system,
wherein said cooling tube assembly, said first heat exchanger, and said second heat exchanger cooperate to maintain a flow of cooling fluid through said cooling tube assembly and said first heat exchanger in a sub-cooled state.

13. A system in accordance with claim 12, further comprising a planar floor separating said vessel into said first compartment surrounding said throat and said second compartment in flow communication with said penetration through said throat, said floor aligned substantially perpendicularly with said throat, said floor comprising an aperture concentrically aligned with said throat.

14. A system in accordance with claim 12, further comprising an orifice coupled in flow communication with said first flow path of said first heat exchanger, said orifice configured to facilitate maintaining a flow of cooling fluid flowing through said first flow path of said first heat exchanger in a sub-cooled state.

15. A system in accordance with claim 12, further comprising a pump coupled in flow communication with said first flow path of said first heat exchanger, said pump configured to provide fluid motive force to drive a flow of cooling fluid through said first heat exchanger and said cooling tube assembly.

* * * * *